United States Patent [19]

Gerhardt et al.

[11] Patent Number: 5,315,530
[45] Date of Patent: May 24, 1994

[54] REAL-TIME CONTROL OF COMPLEX FLUID SYSTEMS USING GENERIC FLUID TRANSFER MODEL

[75] Inventors: David L. Gerhardt, Redondo Beach; Paul J. Su, Hacienda Heights; Tibor I. Lak, Huntington Beach; Donna M. Brakeville, Brea, all of Calif.

[73] Assignee: Rockwell International Corporation, Seal Beach, Calif.

[21] Appl. No.: 930,489

[22] Filed: Aug. 14, 1992

Related U.S. Application Data

[63] Continuation-in-part of Ser. No. 560,415, Jul. 30, 1990, abandoned.

[51] Int. Cl.$^5$ ............... G05D 9/00; G06F 15/46
[52] U.S. Cl. ............... 364/510; 364/578; 364/DIG. 1
[58] Field of Search ........... 364/578, 509, 510, 801, 364/803, 495, 232.3, 512

[56] References Cited

U.S. PATENT DOCUMENTS

| | | | |
|---|---|---|---|
| 4,559,610 | 12/1985 | Sparks et al. | 364/803 |
| 4,562,552 | 12/1985 | Miyaoka et al. | 364/510 |
| 4,613,952 | 9/1986 | McClanahan | 364/578 |
| 4,866,663 | 9/1989 | Griffin | 364/578 |
| 4,868,770 | 9/1989 | Smith et al. | 364/578 |
| 4,885,706 | 12/1989 | Pate et al. | 364/551.01 |
| 4,935,886 | 6/1990 | Choka | 364/578 |
| 4,965,713 | 10/1990 | Hong et al. | 364/149 |
| 4,989,166 | 1/1991 | Akasaka et al. | 364/578 |

Primary Examiner—Thomas G. Black
Assistant Examiner—Collin W. Park
Attorney, Agent, or Firm—Lawrence N. Ginsberg; Charles T. Silberberg

[57] ABSTRACT

A computer program is disclosed for specifying and solving a fluid transfer problem. Schematic manager means are provided for generating and modifying a pictorial representation of a fluid system schematic having a plurality of components. The schematic manager means Is fluid and process independent. Replicator means are provided for generating a set of simultaneous equations from the pictorial representation and for assuring that the schematic manager remains fluid and process independent. A generic run-time simulation module is provided for solving the set of simultaneous equations, thereby allowing the computer program to adapt to variations in component state and fluid state as a function of system parameters. A fluid and property database manager is invoked by the simulation module, for allowing simulation of fluid flow processes having fluid states which may be unknown at the time of model creation. The data display routine is provided for displaying program results, thereby obviating any requirement for user coding.

4 Claims, 12 Drawing Sheets (2.3.31)
Current Fluid Data Base: SOURCE:EDOFLD.FLD   SIMPLE FEEDLINE   Component ID: 2

Enter Option: ■, and Press RETURN/ENTER key

1  Fluid Type                          Current Selection:
2  Roughness                           HELIUM
3  Type of Bend                        SMOOTH/DRAWN TUBING
4  Environmental Heat Transfer         NONE
X  <EXIT>                              ADIABATIC Define:
Inside Diameter (D)              0.2500      (in)
Outside Diameter                 0.3000      (in)
Length (L)                     120.0000      (in)
Change in Elevation (H)          0.0         (in)
Bend Angle (Theta)               0.0         (degrees)
Bend Radius (r)                  0.0         (in)
Surface Area                     0.0         (ft^2)

FIG. 4

START NEW, RECALL EXISTING MODEL :

(2.0) Current Model Name: SOURCE:DLG1

1 LIST/ SELECT/ COPY models
2 go to SCHEMATIC manager
3 EDIT components
4 EDIT fluids
5 modify model ENVIRONMENT
6 SPECIFY model OUTPUT requirements
7 generate HARDCOPY output
8 VIEW results (plots, tabs)
9 RUN current model
X <EXIT>

Enter Option: ▨, and press RETURN/ENTER key.

FIG. 10

(2.3.13) SPHERICAL SUBCRITICAL STORAGE TANK   Component ID: 1
Current Fluid Data Base: SOURCE:EDOFLD.FLD Enter Option: ▓ & Press RETURN/ENTER key    Current Selection:
1   Fluid Type                                HYDROGEN
2   Non-Condensible Ullage Gas No. 1          HELIUM
3   Non-Condensible Ullage Gas No. 2
4   Environmental Heat Transfer               ADIABATIC
X   <EXIT>

Define:
Tank Internal Diameter (D)                    25.0000   (in)    Thermal Cap.(MCpW)  200.0000  (BTU/R)
Calculated Surface Area                       13.6356   (ft^2)  Tank Wall Thickness   1.0000  (in)
Positive Expulsion Device (Y/N)                  N
Elevation Of Tank Feedout Above Tank Bottom (delta x)    0.0    (in)

Initial Conditions:
Liquid  Mass                    10.0000    (lbm)
        Temperature             35.0000    (deg-R)
Gas     Temperature            100.0000    (deg-R)
        Partial Press. (Gas No.1)  110.0000  (psia)
        Partial Press. (Gas No.2)    0.0     (psia)
Ullage Wall Temperature        100.0000    (deg-R)

SPECIFY MODEL OUTPUT REQUIREMENTS

Current Model Name: DLG1

Define Data to be Computed/Saved;   Enter Option: [1]

1   Specified Transducer Output [DEFAULT]

2   Complete Data Dump

Output to be Displayed During Run;   Enter Option: [C]

A   System SCHEMATIC [DEFAULT]

B   TABULAR output

C   Specific Data PLOT

Enter X to Exit: [X] ,and press RETURN/ENTER key

B:branch Mdot  /F:flowrate  /I:iteration  /M:Mass  /N:pump speed  /P:pressure
Q:heat transfer  /T:temperature  /V:volume  /%:valve position
Type of Transducer be displayed during run =_

FIG. 13

REAL-TIME CONTROL OF COMPLEX FLUID SYSTEMS USING GENERIC FLUID TRANSFER MODEL

This is a continuation-in-part of copending application Ser. No. 07/560,415 filed on Jul. 30, 1990, now abandoned.

BACKGROUND OF THE INVENTION

This invention was conceived during work under contract NAS9-17491 with the National Aeronautics and Space Administration. The Government may have certain rights herein.

The present invention relates to methods for specifying fluid transfer systems and, more particularly to a computer software program that accurately simulates the fluid system transfer process specified.

Typically, the fluid transfer analysis in support of large projects involves multiple programs and frequently requires input from different functional disciplines. Minor changes in the characteristics of a specific fluid system incurs substantial impacts in time and cost to revise the system model. Also, the level of accuracy depends on the users analytical expertise or the time allowed to perform the analysis.

Alterations in the topology of a fluid transfer system also impacts the nature of the simultaneous equations formulated to represent the specific problem.

In addition, conventional programs leave the specification of the fluid properties database (and, more importantly, the database limitations) to the end user. This frequently results in anomalous behavior at the limits of the database range, or during regions of fluid phase change.

OBJECTS AND SUMMARY OF THE INVENTION

A principle object of the present invention is to automatically assure consistency and analytical accuracy between a pictorial schematic representation of a fluid transfer system and the simultaneous equations necessary to implement the representation.

Another object is to provide a fluid properties database manager with sufficient intelligence to properly handle all fluid regimes without user intervention.

Another object of the present invention is to simulate fluid systems of "arbitrary" complexity or topology using the appropriate fluid mechanics and thermodynamics involved in fluid storage and transfer.

Yet another object is to allow the user to create or modify their own unique fluid/material databases, as well as providing protected "standard" databases.

A computer program is disclosed for specifying and solving a fluid transfer problem. Schematic manager means are provided for generating and modifying a Pictorial representation of a fluid system schematic having a plurality of components. The schematic manager means id fluid and process independent. Replicator means are provided for generating a set of Simultaneous equations from the pictorial representation and for assuring that the schematic manager remains fluid and process independent. A generic run-time simulation module Is provided for solving the set of simultaneous equations, thereby allowing the computer program to adapt to variations in component state and fluid state as a function of system parameters. A fluid and property database manager is invoked by the simulation module, for allowing simulation of fluid flow processes having fluid states which may be unknown at the tune of model creation. The data display routine is provided for displaying program results, thereby obviating any requirement for user coding.

The analytical model defining the thermodynamic processes (fluid transfer, pressurization) are based on a quasi-steady state approach in which the instantaneous time rate of change of pressure, temperature, and mass are expressed as a function of the fluid system energy state. These rates are subsequently integrated to update the fluid thermodynamic states during the system simulation. This approach allows either steady state or transient solution of complex fluid-thermodynamic systems with a high degree of accuracy.

The term "generic fluid transfer model" or "GFTM", as used herein, refers to the presently disclosed and claimed software program and method of specifying a fluid transfer system. This is the terminology used during this model's development by Rockwell International Corporation, under contract with NASA.

Other objects, advantages and novel features of the present invention will become apparent from the following detailed description of the invention when considered in conjunction with the accompanying drawings.

BRIEF DESCRIPTION OF THE DRAWINGS

FIG. 4 is a screen display of a typical component definition panel.

FIG. 10 is an introductory/selection screen display illustrating the options for editing prior models, specifying the output requirements of the model viewing the results, running the model, and creating a new systems schematic.

FIG. 12 illustrates a definition panel for a spherical subcritical storage tank.

FIG. 13 is a screen display illustrating the options available to the user for specifying output from the GFTM program.

DETAILED DESCRIPTION OF THE INVENTION

Figure 1:
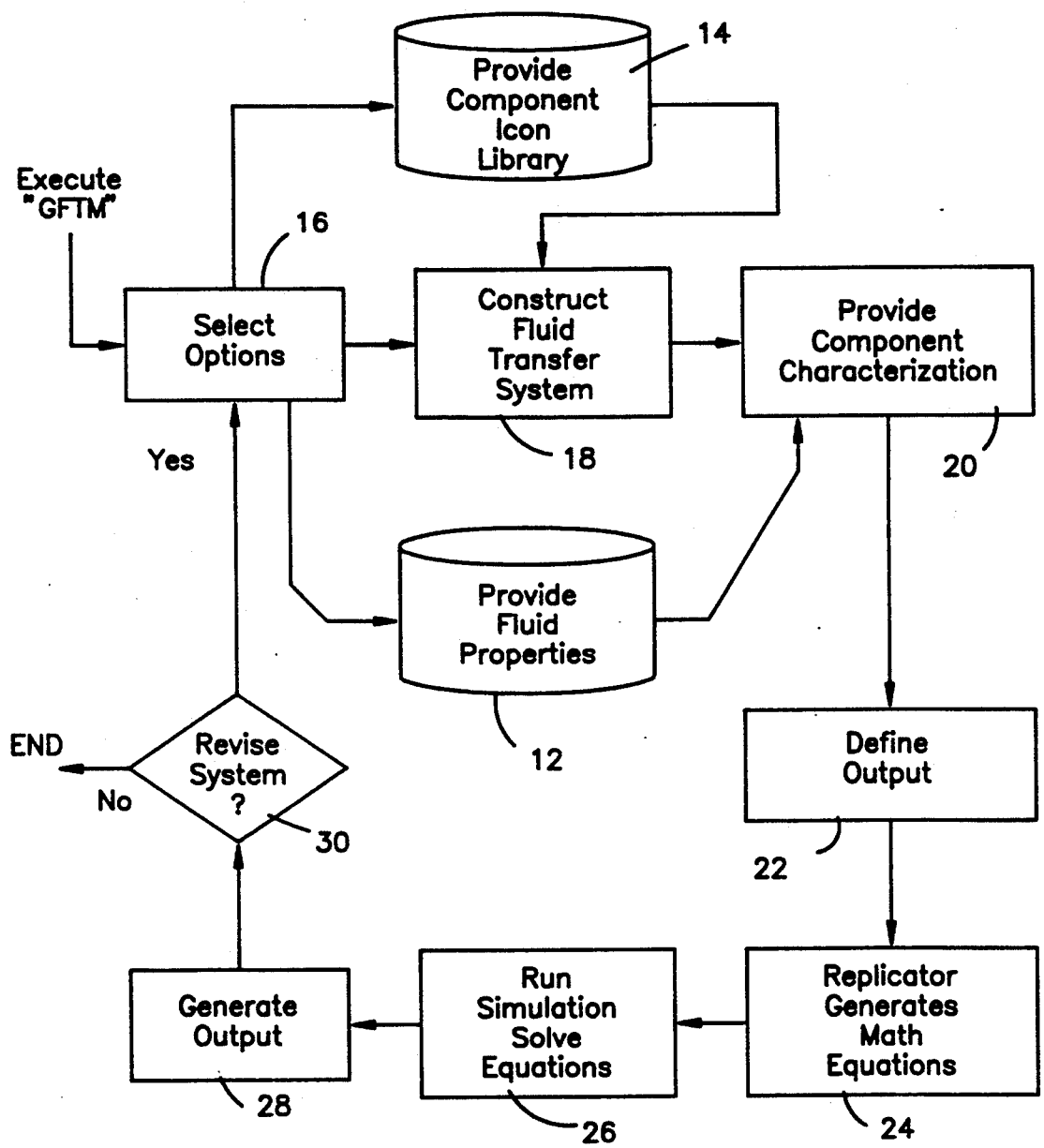
FIG. 1 is a flow diagram illustrating the steps utilized by the present invention to specify a fluid transfer system.

Referring to the drawings and the characters of reference marked thereon, FIG. 1 is a top level functional flow chart of the present invention, designated generally as 10.

A database 12 is provided which includes electronic documents containing thermo-physical properties. A second database 14 is provided which includes electronic documents, each containing a set of icons representing fluid transfer system components.

Upon execution of the GFTM program, the user selects command options on a computer controlled display system (CCOS). The introduction/selection full screen panels allow the user to gain access to GFTM, check GFTM system messages, tutorials and access control information (passwords, GFTM default directory, etc.). This top level selection process allows the user to access options, the fluid transfer modeling process and the creation or modification of fluid or material databases. Selection of an option is indicated by process block 16.

The fluid properties database is organized in three major sections. The first section includes data representing a fluid saturation curve. Pressure and temperature data pairs are provided which define the saturation curve for each specific fluid. This section provides the capability to analyze systems which are not all gaseous or all liquid in nature, which is of critical importance, since the control of actual system frequently requires the ability to detect the onset of specific thermodynamic fluid changes, and reconfigure the system to mitigate specific conditions.

A second section contains specific gaseous and liquid properties. At each fluid isobar for each temperature, the following data are noted: Internal energy, enthalpy, entropy, $C_v$, $C_p$, density, two properties phi and theta which define the supercritical nature of fluids, thermal conductivity, viscosity, and speed of sound.

The third section includes miscellaneous fluid data including molecular weight, triple point pressure, and critical pressure.

The fluid properties database manager, which processes the information in that database, is capable of providing the appropriate fluid properties information to the GFTM program. This allows the user to view, modify, plot and access the fluid properties data, and to create new databases for new fluids, to add new pressure isobars for existing fluids and to perform global arithmetic operations on an entire database. (This includes the capability of inputting data in metric units and transforming the entire database to conventional U.S. engineering units.)

The command features accessible from the fluids database manager are: 1) List/Select of (databases/fluids/pressures/temperatures); 2) Edit/view (fluid property table); 3) Edit/view saturation curve; 4) Copy (property values from database 1 to database 2); 5) Add/delete (fluid or database); and, 6) XY plot (of property table/P&T curve).

A materials database (not illustrated in FIG. 1) is also provided in GFTM. The manager for the materials database has a much smaller number of properties specified for each material than the fluid properties database. As a function of temperature and pressure, the user can access the following material properties: Thermal conductivity, specific heat ratio ($C_p$), and density.

The GFTM component icon library 14 is utilized by the schematic manager to create and modify fluid system schematics. In standard network diagrams, circles often represent processes and arrows represent flows. In GFTM, the icons represent the components, or processes, and the flow is defined by the connectivity established on the schematic.

An "icon" is a pictorial representation of an object. In this program, icons are abstract representations of physical items such as valves, lines, pumps, etc. However, the icons do not represent a specific individual physical component. The relationship of one icon to another uniquely identifies a particular component. For example, all lines of a certain type can be represented by the same icon, but each individual line has unique attributes (i.e. line length, diameter, etc.).

Figure 2:
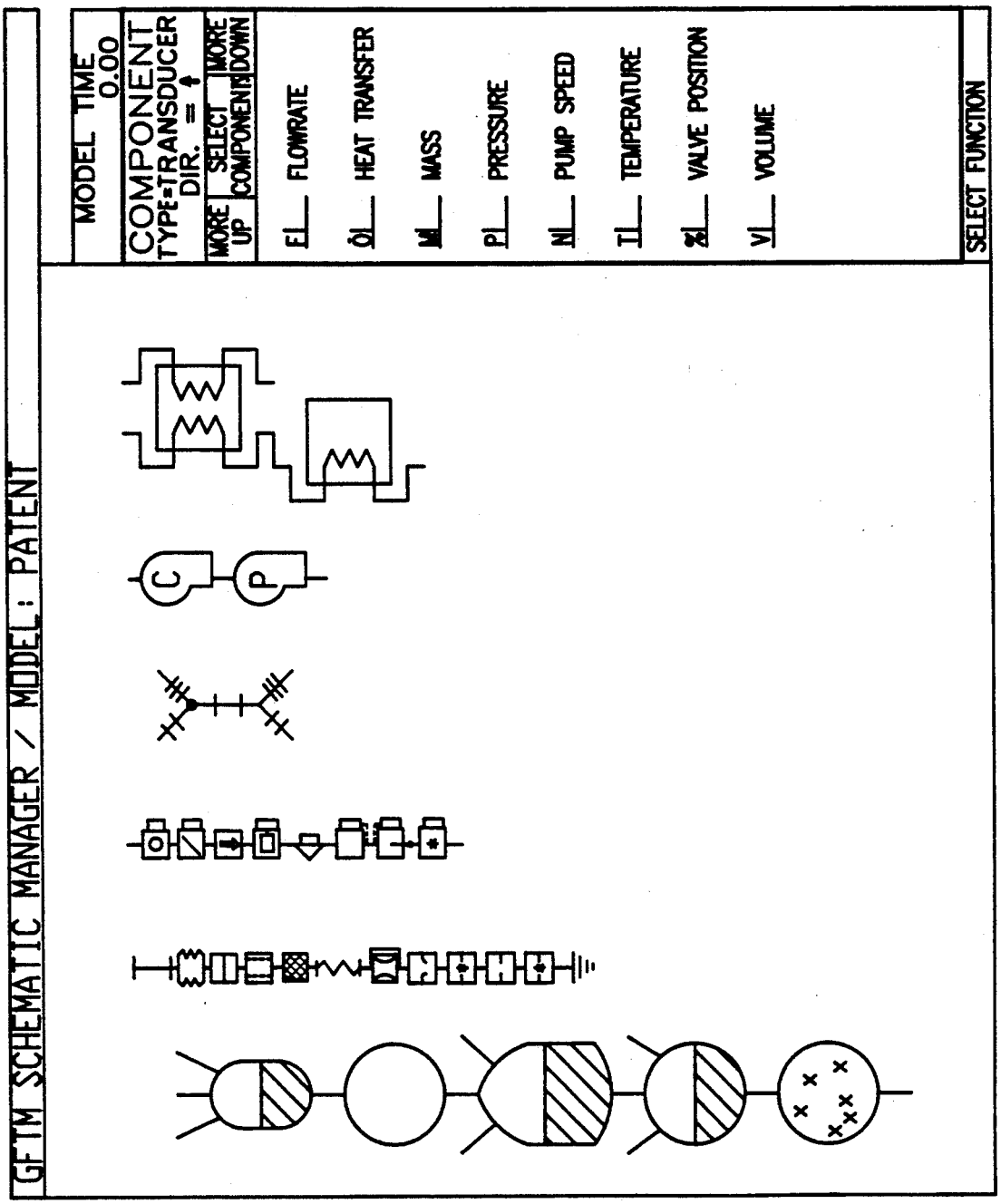
FIG. 2 is a screen display, illustrating the typical icons available for the subject invention.

FIG. 2 is a screen display which illustrates the typical icons available for the subject invention. The schematic manager of GFTM provides a mechanism which allows the user to graphically construct the fluid system configuration to be evaluated by manipulating the icons provided in the component icon library. Schematics of considerable complexity may be created once the user becomes familiar with the process of picking and moving the icons within the schematic manager. Construction of the fluid transfer system 18 is illustrated in process block 18.

Figure 3:
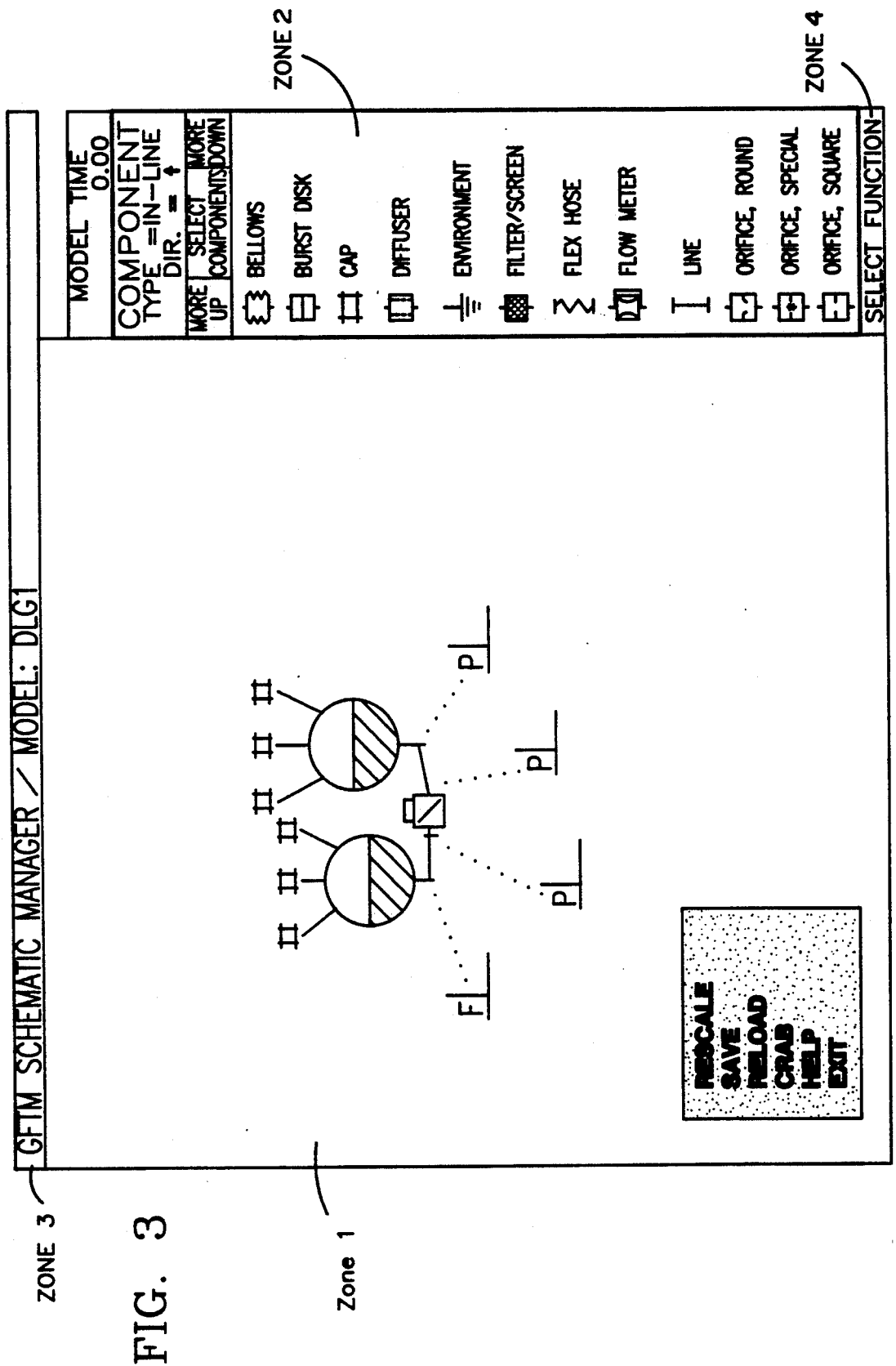
FIG. 3 is a screen display, illustrating the four separate display zones on the schematic manager editing menu.

There are four separate display zones on the schematic manager editing menu. These zones are illustrated in FIG. 3. Zone 1 is the schematic display area, Zone 2 is the icon display area, Zone 3 is the display information and status area, and Zone 4 is the message area. GFTM automatically assists the user in positioning the cursor by making zones I and 2 the only active zones to the cursor. If the program places the cursor in Zone 1, it does so because it expects the user to pick an icon in the schematic for some operation. If the cursor is placed in Zone 2, the user may pick an icon from the menu.

The provision of component characterization is accomplished through the use of a third database including electronic documents representing component definition panels. (Such a characterization is denoted by process block 20 in FIG. 1.) Component definition panels complement the information contained in the schematic of the schematic manager to completely specify the unique fluid transfer system being modeled. A typical component definition panel is shown in FIG. 4. As illustrated in FIG. 4, the component definition panels are the user's means of specifying the fluid involved, heat transfer options selected, and the detailed sizing data required for fully defining a specific fluid transfer component. For active components such as pumps and valves, GFTM allows the components to sense the state of the fluid system (as a function of time), and generate "control" commands which might be used to alter the state of the system by altering the characteristics of other components in the system.

Prior to running a particular model, it is necessary to precisely define the information to be created and displayed (i.e. process block 22). This involves specification of the model start/stop time, time step selection, description of the information to be saved as an output file, and definition of the graphical or tabular information that the user desires to be displayed on the CRT during the actual running of the model analysis.

The GFTM program is broken loosely into two functional sections—procedural and run-time operations. Procedural operations include the operations disclosed hereinabove, including the selection and specification of program options or features (panels, menus, etc.). Run-time operations, on the other hand, are functions which are directly involved with the running of the program (i.e., analysis, code, equation solution, etc.). As long as the specific hardware on which the GFTM program is run is fast enough such that the simulated time domain events occur more rapidly than "real" time, the method described may be used to define error functions which may be directly applied to the control of (or failure analysis of) a given real fluid system. The run-time operations are therefore coded for maximum speed, so that the method may be used for providing real-time control of complex fluid systems which require dynamic, real-time reconfiguration of the fluid transfer system components.

Referring now to process block 24 in FIG. 1, the GFTM replicator is the software module which generates the set of simultaneous equations. These equations ultimately provide a solution of the particular fluid transfer problem under analysis. The GFTM replicator functional operations are summarized in FIG. 5.

Figure 5:
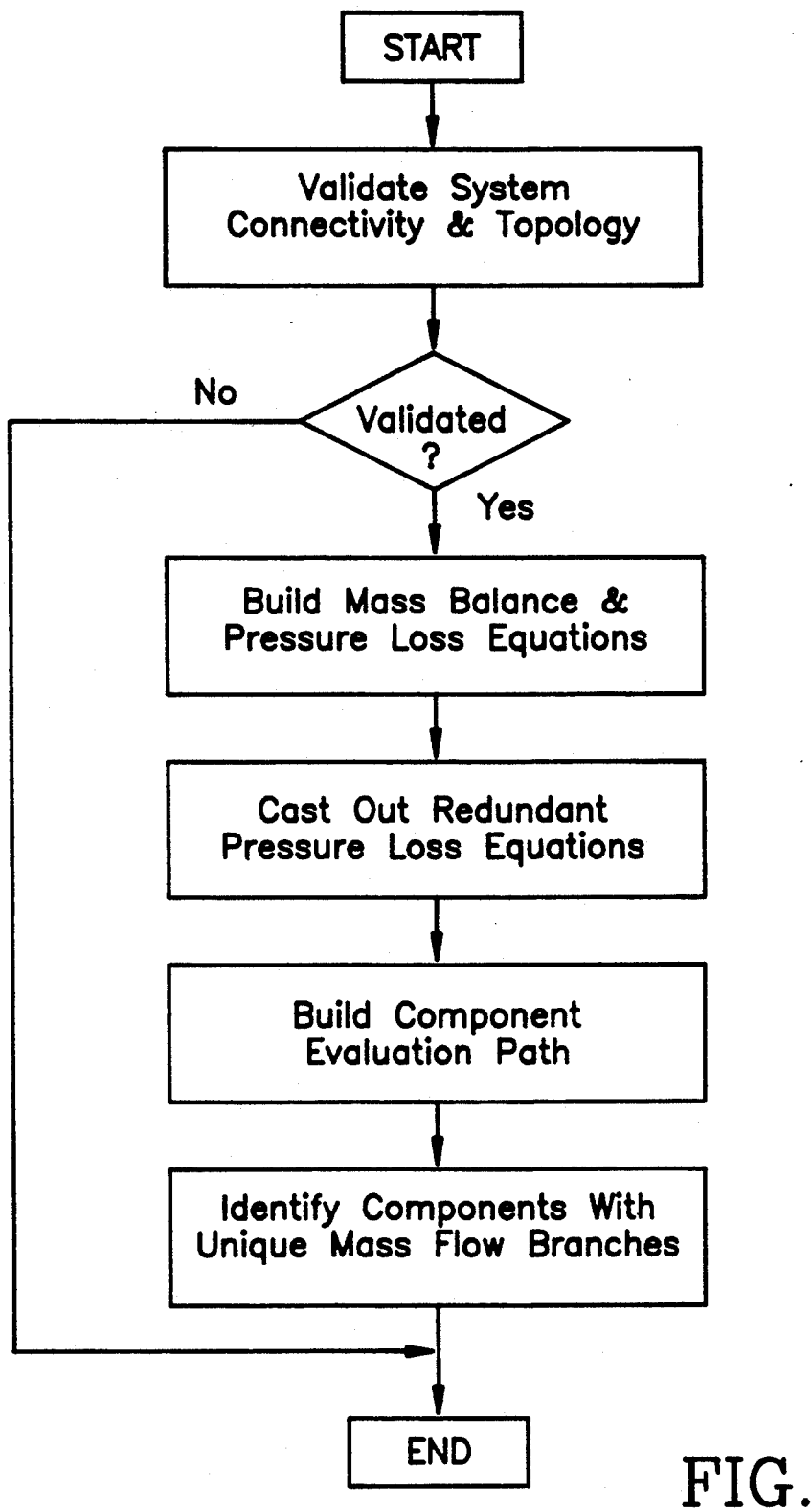
FIG. 5 is a flow diagram illustrating the process used by the replicator.

FIG. 5 illustrates the process whereby the replicator takes a schematic system, checks to assure that the system has consistent connectivity between the components and proper topology and then creates the necessary simultaneous equations representing mass balance and pressure loss for solution of the flow rate problem under investigation.

The following representative rules summarize the constraints preferably imposed upon GFTM through use of the replicator to assure a consistent solution:

1. All "external" (i.e. origination/termination) points of a schematic must either be "Caps", or "Environments".

2. A fluid source must always be a storage tank (and storage tanks should have a higher pressure than the surrounding environment).

3. All components have distinct "in" and "out" ports, which must be connected "in" to "out" on the schematic (except caps, environments, and tanks).

4. For schematic Purposes only, all ports on caps, environments, and tanks may be considered "neutral" (either "in" or "out").

5. Flow paths can only "diverge" or "converge" at:
   a) divergent branches
   b) convergent branches, and
   c) "virtually" connected components (convergent or divergent manifolds).

6. Mixing of fluid may only occur in a subcritical tank. All other components must be connected to components of the same fluid type (heat exchangers may see two fluid types, but no mixing will be allowed).

An illustrative example of the process for generating simultaneous equations within the replicator is summarized as follows:

1. Verify that all schematic rules, component network formulation criteria, and component definition panel requirements have been met.

2. Set up a matrix of independent mass flowrates.

3. Select a tank, start at tank exit, and proceed downstream. Create a "name" for the specific branch mass flowrate and add it to the referenced mass flowrate matrix. If no available exit port is on the current tank, proceed to the next tank. If there are no additional tanks, go upstream to an environment or tank cap.

4. Sum the resistance of all components between fluid branch forks. A tank, environment, or cap terminates a specific branch equation. At a fluid fork, if the fork is convergent with respect to fluid flow, flow downstream and add additional Mdot names as required. At a divergent fork, select a downstream path, set flags to indicate direction chosen, and add additional Mdot names to the matrix referenced in "2." above.

5. Repeat process 4 until a tank environment or cap is reached. This completes one pressure drop equation.

6. Pick up the remaining Delta-P or pressure drop equations from the current source. Reset the "furthest downstream" flags first.

7. Test for network, and fluid system equation completeness. Do all forks on the network have mass flowrates defined for all of their branches? Test for completion of network (common components with any other tanks, environments). If the network is complete, generate conservation equations at all forks (sum of mass flowrates=0). Test for completion of the fluid system (have all components on the schematic been "touched"?). Cast out redundant pressure loss equations. Build component evaluation paths for the run-time module. And, identify components with unique mass flowrate branches.

8. Repeat steps 2 and 3 until the entire set of equations for all of the fluid system networks on the schematic are defined.

9. The final result of the replicator process is a set of "m" network equations per schematic with each of the "m" networks containing "n" equations for the "n" unknown mass flowrates in that network.

The replicator generates a set of simultaneous equations which are then solved using a branch matrix technique. This forms the core of a run-time simulation module (i.e. process block 26 of FIG. 1).

Definition of the flowrate levels in complex feedline branches is problematic. It is even more complicated if the number of branches are not explicitly stated, such as in the present case. Use of a flow convergence technique, where the flowrate at one branch is assumed and the resultant flowrate in the other branches are then calculated, can become very complicated and burden the system with computational overhead. To avoid the problems associated with writing logical statements for flow convergence, a flow branch matrix technique was identified. The technique allows the second order flow equations to be reduced to first order equations, by redefining the component flow resistance as a function of mass flowrate. This allows matrix solution of all of the flow branches. The flow resistance ($R_f$) of a component is defined from the total static pressure loss equations $\Delta P$, which includes frictional ($\Delta P_f$) and momentum ($\Delta P_m$) losses:

$$\Delta P = \Delta P_f + \Delta P_m$$

or $$\Delta P = R_f m$$

where $$R_f = (\Delta P_f + \Delta P_m)/m.$$

For components which may be characterized by incompressible flow (liquid flow, and gaseous flow with inlet/outlet Mach number $>0.2$), the frictional and momentum pressure loss is defined as:

$$\Delta P_f = k/(2\rho g_c)\,(m/A)^2$$

$$\Delta P_m = 1/g_c[(1/\rho_o)-(1/\rho_I)]\,(m/A)^2$$

where (k) represents the component lumped losses (friction, bend, area change, etc). The values ($\rho_I$) and ($\rho_o$) are the component inlet and outlet fluid densities, and (A) represents the component flow area. Consequently, the component flow resistance can be defined as:

$$R = 1/(g_c A^2)[k/2\rho + (1/\rho\rho_o - 1/\rho_f)]](m).$$

The component densities at the inlet and the outlet, ($\rho_I$ and $\rho_o$, respectively, are defined from the static pressure and temperature levels from the fluid property database.

$$\rho_I = f(P_{SI}, T_{SI})$$

$$\rho_o = f(P_{so}, T_{so})$$

For components that cannot be characterized by incompressible flow (sonic orifices, regulators, pumps, compressors, and gaseous flow $>0.2$ Mach number), the flow resistance will be calculated based on the static pressure difference between the inlet and outlet as:

$$R = (P_{SI} - P_{so})/m.$$

Figure 6:
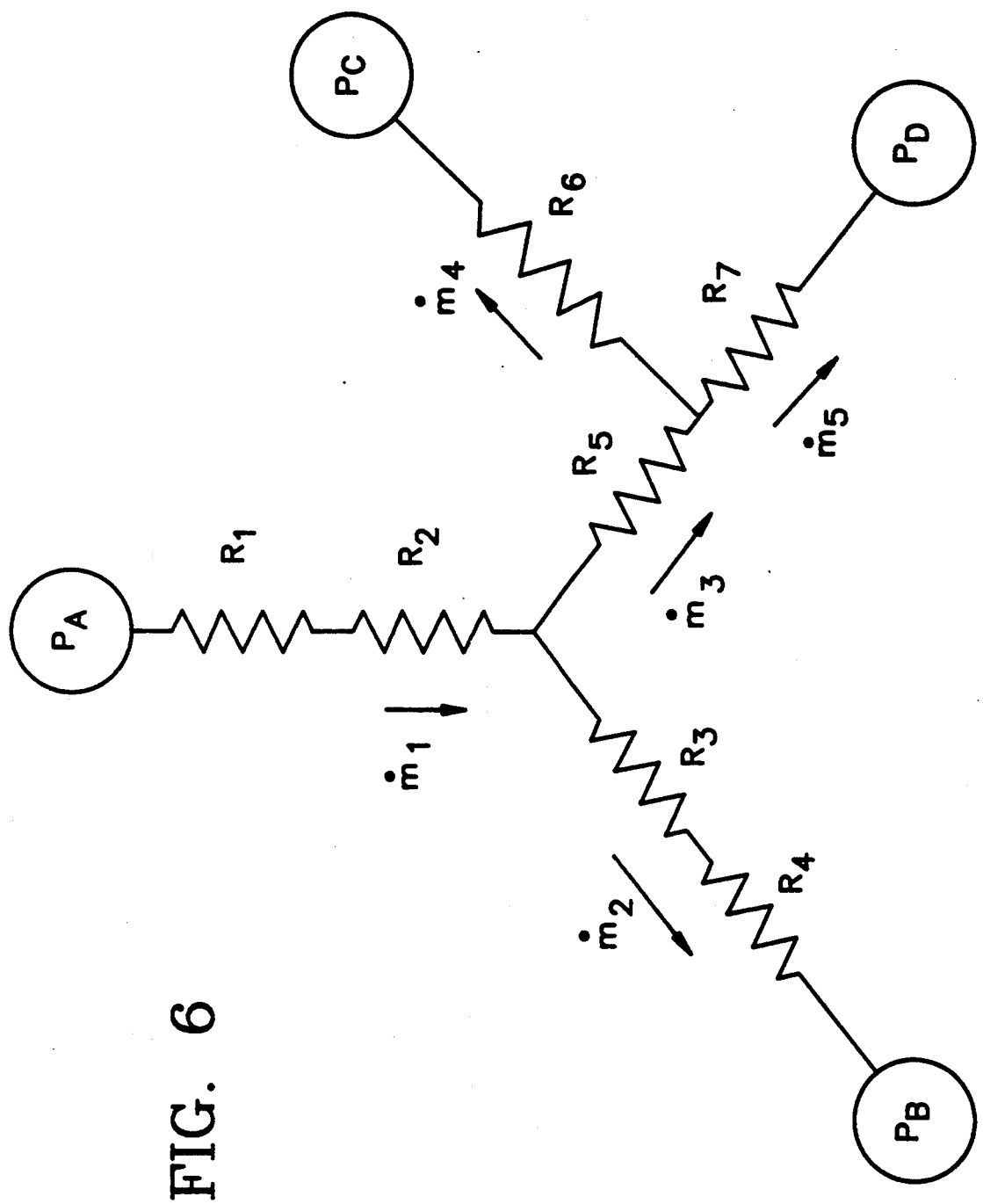
FIG. 6 illustrates a sample branch network of a representative GFTM system.

As can be seen, the flow resistance is not only a function of inlet and outlet condition, but also of flowrate. Because the system flowrate is a function of itself, an iterative solution is required. The resistance value is continually updated based upon the current estimate of flowrate and inlet/outlet conditions until the change in flowrate from one iteration to the next is within the error criteria specified by the user. (The error criteria which is typically used by GFTM to achieve convergence is 0.01%). A sample branch network of the GFTM system is illustrated in FIG. 6.

For the example shown, the matrix equations are:

$$P_A - P_B = (R_1 + R_2)m_1 + (R_3 + R_4)m_2 + \Delta P_{H1} + \Delta P_{H2} + \Delta P_{H3} + \Delta P_{H4}$$

$$P_A - P_C = (R_1 + R_2)m_1 + R_5 m_3 + R_6 m_4 + \Delta P_{H1} + \Delta P_{H2} + \Delta P_{H5} + \Delta P_{H6}$$

$$P_A - P_D = (R_1 + R_2)m_1 + R_5 m_3 + R_7 m_5 + \Delta P_{H1} + \Delta P_{H2} + \Delta P_{H5} + \Delta P_{H7}$$

$$0 = m_1 - m_2 - m_3$$

$$0 = m_3 - m_4 - m_5$$

where, $\Delta P_{H1}$ through $\Delta P_{H8}$ represent the change in hydrostatic pressure level of components 1 through 8. The change in hydrostatic pressure level across a component is calculated, based on the change in elevation from inlet to outlet (specified at the component definition panel) with respect to the acceleration field. By initializing each component resistance, the first estimate of system flowrates ($\dot{m}_1$ thru $\dot{m}_5$) are defined by solving the matrix equations with given boundary conditions (Pa, Pb, Pc, Pd).

Using the estimated flowrate levels and resistances, the pressure levels at each of the component inlet/outlet ports are calculated. The process begins with components which are connected to storage tanks and terminate at tanks for environments (sources or sinks) since the pressure at these nodes are known and are constant during the iterations. (For tanks the pressure level at the component/tank interface is equal to the storage tank pressure plus hydrostatic head, and for the environmental node the pressure is defined by the user.) It is assumed that the total pressure at the outlet of one component is equal to the inlet TOTAL pressure of the adjacent component (no losses across components interface). Therefore, $$(Poi)_n = (Poo)_{n-1}$$

where $(Poi)_n$ is the total pressure at the inlet of component (n), and $(Poo)_{n-1}$ is the total outlet pressure of the adjacent component (n−1). The static pressure at the component inlet is therefore equal to the total pressure minus the dynamic pressure, i.e., $$(P_{si}) = (P_{oo}) - 1/(2\rho_I g_c)(m/A_I)^2.$$

The static pressure at the component outlet is equal to:

$$(P_{so}) = (P_{si}) + \Delta P_H - \Delta P,$$

which is the sum of the change in hydrostatic pressure ($\Delta P_H$) and total pressure loss (frictional and momentum). The total pressure at the component outlet is then calculated from the outlet static pressure by adding it to the dynamic pressure term, i.e.

$$(P_{oo}) = (P_{so}) + 1/(2\rho_o g_c)(m/A_o)^2$$

The calculated outlet total pressure term is consequently used as the inlet condition for the next component, and so on. Since the component inlet and outlet conditions have been updated, the component flow resistance can now be adjusted based on the inlet/outlet condition and mass flowrate so that it is ready for the next iteration.

As mentioned earlier, the definition of the flowrate levels are not only a function of component pressure loss, but also of the inlet and outlet temperature at each component, since the density term is a function of both static pressure and temperature, i.e., $$\rho = f(Ps, Ts).$$

Consequently, the temperature at each component must also be estimated during flow convergence. As in the case of pressure drop, the temperature transport process must also be started at the tanks. The only difference between pressure and temperature calculations is that the process cannot start at any tank, but must start at the "source" tank and proceed to the "receiving" (i.e., implies a vector quantity of flowrate) tank (or environmental sink) in order to keep track of the fluid energy. The fluid energy of a flowing system is characterized by the enthalpy term. The total enthalpy of the fluid in the source tank is defined as a function of total pressure, which includes hydrostatic pressure, and fluid temperature by table look-up from the fluid properties database, i.e., $$Ho = f(Po, To).$$

This total outlet enthalpy from the tank is the total inlet enthalpy of the adjacent component:

$$(Hoi)_n = (Hoo)_{n-1}.$$

To determine the fluid inlet temperature, first the fluid static enthalpy is defined from the total enthalpy by subtracting the fluid kinetic energy term, $$(h_{si}) = (H_{oi}) - Vi^2/(2g_c)$$

$$Vi = m/(\rho_I A_I)$$

where, (Vi) is the fluid velocity at the component inlet. The temperature is then determined from the fluid property tables which correspond to the fluid static enthalpy ($h_{si}$) and static pressure ($P_{si}$), or, $$(T_{si}) = f(P_{si}, h_{si}).$$

This method correctly defines the static temperature for any fluid (ideal or real, liquid or gas) and also includes Joule-Thompson effects and consequently results in higher accuracy for compressible flow where the fluid density is more sensitive to temperature. Also, because the actual fluid properties are used, there are no errors introduced by ideal gas approximations for fluid regions where the ideal gas relationships may be inaccurate or wrong.

In general, the total enthalpy at the component outlet changes as a result of heat transfer (Q), mechanical work ($W_S$) and potential energy due to change in elevation from inlet to outlet ($\Delta Za$), i.e., $$(H_{oo}) = (H_{oi}) + Q/m + W_s/m + \Delta Za.$$

This total outlet enthalpy is passed to the next component and the process is repeated. To determine the outlet temperature, the static enthalpy needs to be determined. The static enthalpy at the component outlet is again defined by correcting for the kinetic energy of the flow:

$$(h_{so}) = (H_{oo}) - V_o^2/(2g_c)$$

where, the term (Vo) is the fluid velocity at the component outlet. Combining the above two equations results in:

$$(h_{so}) = (H_{oi}) - V_o^2/(2g_c) + Q/m + W_s/m + \Delta ZA.$$

Figure 7:
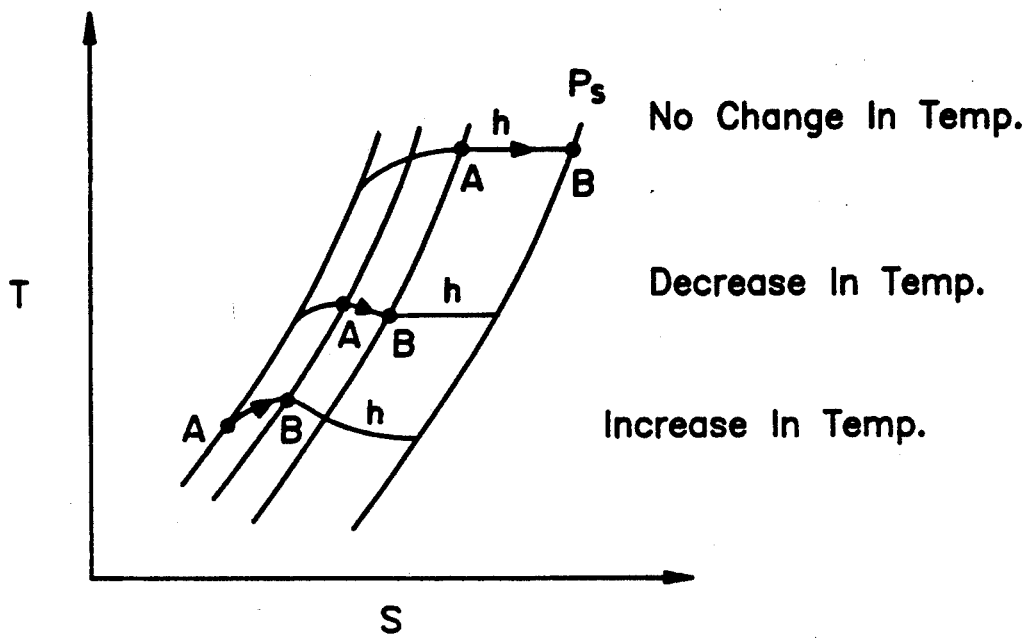
FIG. 7 is a graph of temperature, T vs. entropy, S, illustrating the Joule-Thompson effect for fluid processes.

Since the outlet fluid temperature is defined from static enthalpy and pressure, $$(T_{so}) = f(P_{so}, H_{so}),$$

it can be seen that the temperature will change as a result of heat added or subtracted from the fluid due to heat transfer, work done by components such as pumps, compressors, expanders, turbines, and changes in potential energy in any gravitational environment. Because this method uses actual fluid enthalpy in determining temperature, fluid phenomena associated with flow across orifices or regulators (Joule-Thompson effect) are accounted for (see FIG. 7).

Figure 8:
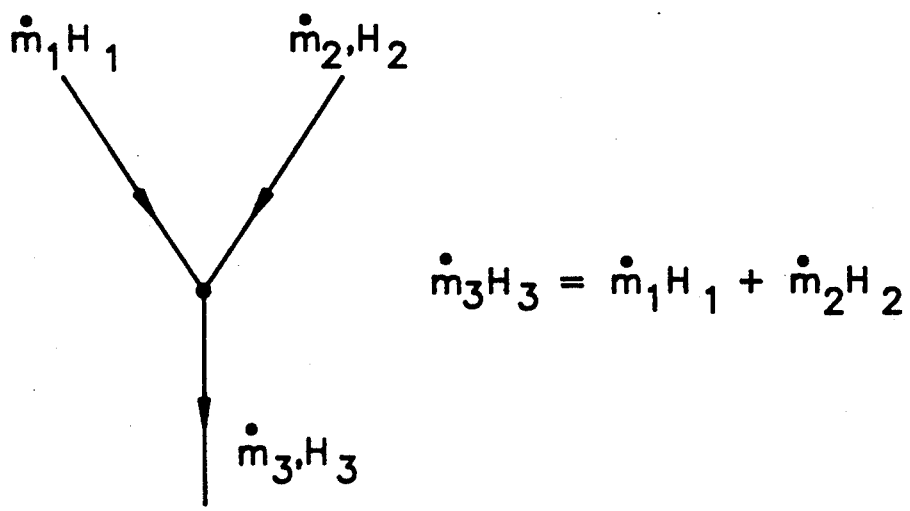
FIG. 8 illustrates a mixing of two fluids, conserving the enthalpy.

To account for mixing of two flow branches with different temperatures, the total enthalpy of each branch is conserved, (see FIG. 8).

For the figure shown above, the total enthalpy at the outlet of the convergence node is:

$$m_3 H_3 = m_1 H_1 + m_2 H_2$$

$$H_3 = (m_1 H_1 + m_2 H_2)/m_3$$

The static enthalpy and temperature is defined in the same way as before:

$$h_{S3} = H_3 - V_3/2g_c$$

$$V_3 = \dot{m}_3/(\rho_3 A_3)$$

$$T_{S3} = f(P_{S3}, h_{S3}).$$

the previous discussion presented the analytical approach used in solving both system flowrate, pressure, loss, and temperature transport phenomena used by the present invention. The technique has been verified for a large number of complex feed system networks. The following section will define the flow resistance parameter for each of the components currently available for GFTM.

Figure 9:
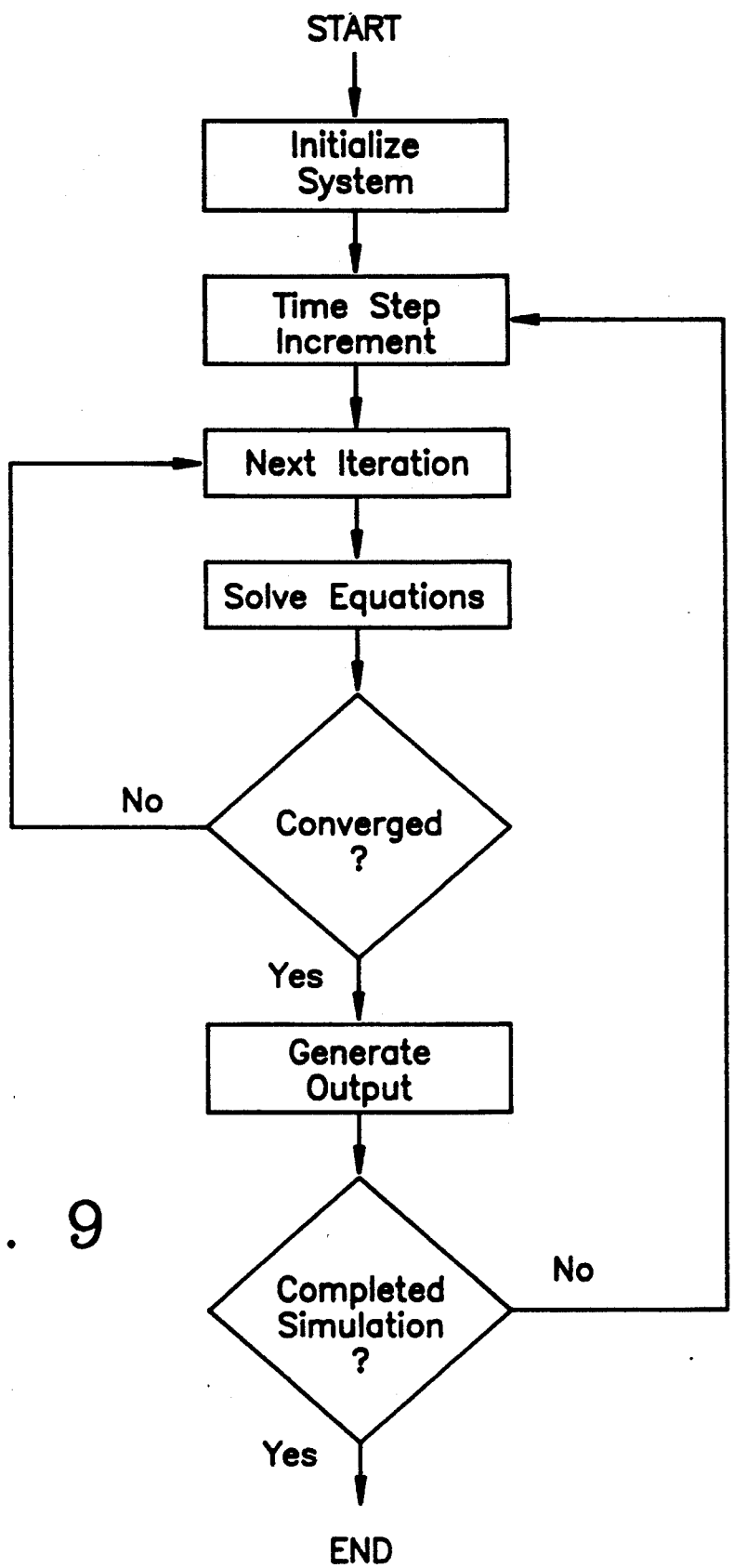
FIG. 9 is a flow chart illustrating the run-time/simulation logic of the analysis module.

The analysis module, illustrated in FIG. 9, takes the current model, verifies its completeness, utilizes the simultaneous mass flowrate equations from the replicator, initializes all components, initializes global parameters, starts flow transfer simulation, converges on every network at each timestep, and gathers output until termination criteria are met. This functionality of the analysis module provides the capability to simulate the performance of real-time fluid systems, and the comparison of this predicted performance with the actual status of the sensors in the physical system allows real-time failure analysis and control. The functionality of the analysis module is therefore critical to distinguish (in a real system) between failure of a given component, and a false indication of a component failure which is due to a failed sensor. There are four major activities in the GFTM simulation: Model initialization; resistance mass flowrate pressure and temperature calculations; updating integrators; and gathering output information.

Functional block 28 of FIG. 1 illustrates the point in system modeling at which the actual output of the GFTM program is generated. GFTM allows the user to view or generate data which may be displayed in either graphical or tabular format.

The data output specification procedure should begin when the user commences creation of the GFTM model. Usually the user will not want to accept the "data dump" output format, and this implies that when the actual system schematic is being built (in the schematic manager), that the user must include transducers of the appropriate type for all information which is desired. In the example, transducers for flowrate and pressure were both specified. In a typical GFTM run, the user will specify transducers for all model output data which is required.

In a normal GFTM analysis, the following procedure is followed for data output generation:

1. Determine whether a "data dump" output or a specific transducer output is desired.

2. If a specific transducer output is required, be certain that the systems schematic includes the proper transducers and that they are correctly connected to the desired component outlet ports.

3. Specify output to be displayed during program execution (plot, or tab, vs. tune).

4. After the run is completed, the user may view plots of additional transducer types or generate output data files for the run which may then be printed or used for other analyses.

The process of data output specification is initiated during schematic generation (transducer specification) and completed following component definition panel specification. The actual output of the program is produced per the specification of FIG. 1, block 22, upon run completion.

The final functional element in FIG. 1, decision block 30, indicates the opportunity which is provided to the user to either revise the system which has just been completed in the schematic manager or through modifying the component definition panels or to accept the output which has been generated and end the computer run.

EXAMPLE

This example illustrates the operation of the GFTM program by walk-through a simplified fluid flow model which incorporates all of the functional aspects of a complex flow system. In the present example, the problem is to simulate pressure-fed fluid transfer between two subcritical hydrogen tanks, controlled by an in-line valve. It is desired to model the period between 0.0 and 1.0 second; with the valve initially closed, opening at 0.1 seconds, and closing at 0.8 seconds.

The user starts by running the GFTM program and identifying himself in the model to be modified or created.

After initial log-on, a panel is provided which includes options for editing prior models, specifying the output requirements of the model, viewing the results, running the model, and creating a new systems schematic. This panel is illustrated as FIG. 10. Option 2 is selected which accesses the schematic manager.

Figure 11:
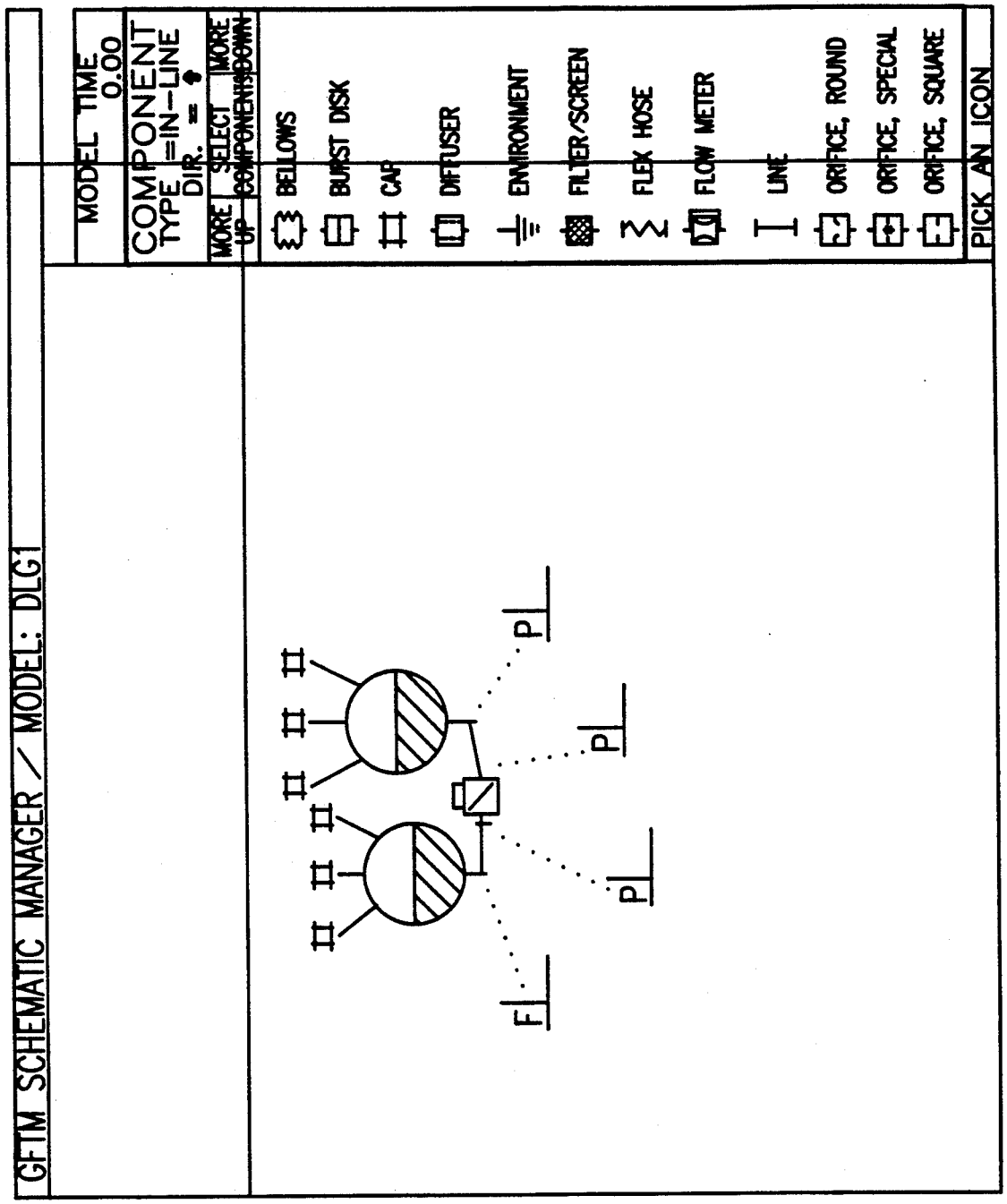
FIG. 11 illustrates a sample schematic manager screen.

FIG. 11 illustrates a schematic manager screen for the present example. The schematic manager includes a "pop-up" component selection menu which offers choices including tanks, inline components, transducers, valves, flow mixing devices, rotating machinery, heat exchangers, and space for future program expansion.

Specific components are selected using the terminal thumb wheel, mouse or cursor options and are placed by moving the cursor in the schematic management area and hitting a key to place the specific component selected. Components are added in a chain until the user instructs the program to stop adding components with the negation symbol. The schematic manager assists the user in placement of components by being 'aware' of the logical "ins" and "outs" of each specific class of GFTM components.

Upon completion of a specification of the fluid system topology, a check must be made to assure that there are no open ports or unconnected components in the system schematic. The GFTM schematic manager assists the user in this process. The final process in the schematic manager includes placing transducers (components used to define the output desired of the particular model) and locating those transducers at the appropriate place on the schematic manager. At any point the user is enabled to add, delete, move or alter the schematic based upon his particular needs or desired revisions to the fluid system. Using the process summarized above, one can select tanks, lines, valves, caps and other fluid system components to develop a system similar to that presented in FIG. 11. The final process in the schematic manager is to save the schematic such that the user may subsequently return to it at a future time or use the schematic as the basis of a future but slightly different model. Furthermore, this allows the saved process to provide a continuity check on the validity of the topology of the system schematic before proceeding to the next portion of the GFTM program.

The next step in the creation of a GFTM model includes specifying the detailed characteristics of each component on the schematic created. The first panel with which the user would be presented for the current system is that for spherical subcritical storage tank. The model definition panel for spherical subcritical storage tank is illustrated in FIG. 12. The user is presented with a full screen panel with provisions for invoking different program options, specifying fluid types analysis options and defining the specific characteristics of the component under consideration. The user utilizes the tab key to move around the full screen panel, fill in the necessary specification parameters and, when all data is entered, hit the carriage return key -to enter the data and to complete the data input panel. The GFTM program knows the connection order of the components for the specified schematic and sequentially increments the different components in the schematic, presenting the panel for each component to the user for specification of the component characteristics. This process is continued until all components have had their specific characteristics defined and entered into the program.

Three steps remain to complete the definition and execution of the specified example problem.

First, the specific output which is required from the current model simulation must be specified. FIG. 13 illustrates options available to the user for specifying output from the GFTM program. Either a complete program data dump or specified transducer output is available. The user also has the option of specifying whether he wishes to view the schematic, a time dependent tabular output or a specified data plot during program execution.

Having completed all schematic component and output data definition, the user is ready to invoke execution of the actual simulation. The first thing which is presented to the user is a listing of the replicator output describing the number of simultaneous equations created. Next, the actual system equations and the evaluation path for the analysis are presented to the user. Finally, the specific data representation requested is displayed on the screen and incremented at each time step as the program proceeds through completion. After program completion the user may then request GFTM to generate hard copy output of any of the specific variables specified either under the transducer or data dump format. The user may also review any specific data items, either graphically or in tabular output, and generate a data file for subsequent use in GFTM or other data programs.

Finally, the user may either continue with an additional case, modify the existing one, or exit the program entirely.

Obviously, many modifications and variations of the present invention are possible in light of the above teachings. It is, therefore, to be understood that, within the scope of the appended claims, the invention may be practiced otherwise than as specifically described.

What is claimed and desired to be secured by Letters Patent of the United States:

1. A method for controlling a complex fluid system in real-time by modeling and reconfiguring a fluid transfer system of said complex fluid system, comprising the steps of:
   a. providing a first database including a first plurality of electronic documents, each of said first plurality of electronic documents containing a set of thermophysical properties of fluids and materials to be used in a required fluid transfer system;
   b. providing a second database including a second plurality of electronic documents, each of said second plurality of electronic documents containing a set of icons representing components of said fluid transfer system in a pictorial system representation;

c. providing a third database including a third plurality of electronic documents, each of said third plurality of electronic documents containing a set of component definition panels which completely specify the necessary component characteristics of said required fluid transfer system components;

d. generating and displaying a plurality of first command options on a computer controlled display system (CCDS) associated with said first database, each of said first command options representing operations utilized to create and manipulate said set of thermophysical properties;

e. generating and displaying a plurality of second command options on a CCDS associated with said second database, each of said second command options representing operations utilized to create said pictorial representation and associated connectivity of a desired fluid system;

f. generating and displaying a plurality of third command options on a CCDS associated with said third database, each of said third command options associated with the specification of said necessary component characteristics for the component definition panels;

g. generating and solving a plurality of simultaneous mathematical equations representing said connectivity and functional operation of the fluid system created in step e, above, utilizing said connectivity and functional operation of the fluid system created in step e, above, utilizing said fluid and material properties of steps a and d, above, and the component characteristics of step f, above, said step of generating and solving said plurality of simultaneous mathematical equations including the steps of:

i) generating and storing information from said pictorial system representation in a linkage table which represents the connectivity between system components and provides numerical representations for identifying components in said fluid transfer system;

ii) utilizing the information of step i, above, in a fluid system replicator means, for creating coefficients and associated set of simultaneous mathematical equations representing said fluid transfer system being analyzed, at each time step in said system specification; and, iii) solving said simultaneous mathematical equations utilizing matrix inversion techniques in an iterative process, with provisions for possible flow reversals between either iterations or time steps altering the form of said equations, said step of generating and solving said plurality of simultaneous mathematical equations thereby obviating any requirement for user intervention or coding; and, h. controlling said complex fluid system in real-time by providing the results from step g, above, to said complex fluid system.

2. The method of claim 1, wherein said step of utilizing said information includes implementing a replicator means for creating the coefficients and associated set of simultaneous mathematical equations includes forming equations independent of fluid state and system topology, includes the steps of:

a. validating the system connectivity and topology, thereby establishing the existence of a solution;

b. building said set of simultaneous equations representing the desired fluid transfer system, utilizing mass balance and pressure drop relationships for said fluid transfer system;

c. utilizing a unique algorithm to selectively 'cast out' redundant pressure drop equations to assure an equivalent number of equations and unknowns;

d. selecting a component evaluation path, which defines an order in which components are evaluated at each time step; and e. identifying components with unique mass flowrate branches, which must be handled as exceptions to the general solution technique.

3. The method of claim 2 wherein said step of generating and solving said simultaneous mathematical equations includes an evaluation process having the sequential steps of:

a. verifying the connectivity of the fluid system;

b. initializing the fluid system state for all components;

c. invoking a replicator means for defining the fluid system simultaneous equations and an initial component evaluation path for determining system characteristics and mass flowrate equation matrix coefficients;

d. incrementing the time step for the fluid system specification;

e. incrementing the network under analysis for the current fluid system;

f. incrementing the iteration in the solution of the current network;

g. incrementing the component being evaluated for the current iteration; and h. evaluating the component resistance characteristics for use in the determination of the mass flowrate equation matrix coefficients.

4. The method of claim 1 wherein said step of generating and solving said plurality of mathematical equations includes:

a. utilizing a subset of said second database, said subset representing 'virtual transducers';

b. applying said virtual transducers to any appropriate fluid component icon of a fluid system constructed utilizing said step of generating and displaying a plurality of second command options;

c. providing information through the replicator means to ascertain the location and type of all virtual transducers; and, d. providing, in said third command options, allowance of 'active' components to be affected in their operation by the magnitude, state, or status of any of said virtual transducers, thus enhancing the ability to solve problems involving active control and/or monitoring.

* * * * *